(12) United States Patent
Caine

(10) Patent No.: US 7,777,912 B2
(45) Date of Patent: Aug. 17, 2010

(54) METHOD AND APPARATUS FOR SELECTIVE EDITING OF AN AUTOMATIC DIGITAL IMAGE CORRECTION

(75) Inventor: Holden Caine, Boulder, CO (US)

(73) Assignee: Fujifilm North America Corporation, Valhalla, NY (US)

( * ) Notice: Subject to any disclaimer, the term of this patent is extended or adjusted under 35 U.S.C. 154(b) by 860 days.

(21) Appl. No.: 11/673,203

(22) Filed: Feb. 9, 2007

(65) Prior Publication Data

US 2007/0201052 A1 Aug. 30, 2007

Related U.S. Application Data

(60) Provisional application No. 60/776,569, filed on Feb. 24, 2006.

(51) Int. Cl.
*G06F 15/00* (2006.01)
*G06K 1/00* (2006.01)
*G06K 15/02* (2006.01)

(52) U.S. Cl. .......................... 358/1.2; 358/1.13

(58) Field of Classification Search .................. 358/1.1, 358/1.13, 1.14, 1.15, 1.9, 2.1, 3.07; 382/167, 382/275, 115
See application file for complete search history.

(56) References Cited

U.S. PATENT DOCUMENTS

| | | | |
|---|---|---|---|
| 6,327,049 B1 | 12/2001 | Ohtsuka | |
| 6,577,751 B2 | 6/2003 | Yamamoto | |
| 6,798,903 B2 | 9/2004 | Takoaka | |
| 6,885,766 B2 | 4/2005 | Held et al. | |
| 6,937,363 B1 | 8/2005 | Yamaguchi | |
| 6,970,229 B2 | 11/2005 | Iida | |
| 7,035,462 B2 * | 4/2006 | White et al. | ................ 382/167 |

* cited by examiner

*Primary Examiner*—Douglas Q Tran
(74) *Attorney, Agent, or Firm*—Woods Oviatt Gilman LLP

(57) ABSTRACT

A method of allowing for selective editing of a digital image that has undergone a correction of at least one area of interest is provided. The method includes: providing for the identification and correction of the at least one area of interest in the digital image while maintaining the digital image; providing the correction of the at least one area of interest as correction metadata; providing a low resolution corrected image using a low resolution version of the digital image and the correction metadata; and allowing the correction metadata to be edited to establish modified correction metadata, wherein a revised version of the low resolution corrected image includes the modified correction metadata.

22 Claims, 2 Drawing Sheets

METHOD AND APPARATUS FOR SELECTIVE EDITING OF AN AUTOMATIC DIGITAL IMAGE CORRECTION

CROSS-REFERENCE TO RELATED APPLICATIONS

This application claims the benefit of U.S. Provisional Patent Application Ser. No. 60/776,569, filed Feb. 24, 2006.

FIELD OF INVENTION

The present invention generally relates to digital image processing systems. More particularly, the present invention relates to an apparatus and method allowing for selective editing of a digital image that has undergone an automatic correction such as red-eye reduction, for example.

BACKGROUND OF THE INVENTION

Digital photo image processing is a rapidly growing technology area. Photographic images may be uploaded as a digital file to a computer using a digital camera or a scanned image appearing on paper or photographic film, for example. The uploaded digital image may thereafter be further digitally processed as desired. Present day photo processing software allows extensive modifications to be either automatically or selectively made to a digital image to improve clarity and color balance, to remove unwanted matter (e.g., "red-eye") and to change the digital frame size to any desired print size, for example. The image processing may be done by the user using image processing software on their personal computer or at a photo kiosk, or a customer may upload the digital image over the Internet to be processed by a photofinishing service, for example. A photofinishing service can modify, print and mail (or otherwise make available) the desired prints or other product having the image thereon (e.g., mugs, blankets, CDs, etc.) to the user/customer. Therefore, a user thus has many options as to how their digital images are ultimately converted to photographs or other image-bearing products (hereinafter collectively referred to as "prints").

Digital image processing systems are known which automatically detect a region of interest in a digital image such as a person's face or eyes, for example, see U.S. Pat. No. 6,577,751 to Fuji Photo Film Co., Ltd., the entire disclosure of which is incorporated herein by reference. In such digital image processing systems having automatic red eye correction, the red eye detection and correction steps are carried out by the system without user input. The red eye correction step does not change the raw image data which remains unchanged. Rather, the red eye correction is implemented on the displayed image. The red eye correction may thus be considered as a second digital layer over the first raw digital image layer. Prints of the digital image are generally productions of the digital image as displayed, thus including the second digital layer.

It is possible for the system to incorrectly identify a red object as a red eye region and implement a red eye correction on the displayed image leading to an incorrect digital print and customer dissatisfaction. It would therefore be desirable from a customer satisfaction standpoint to have a digital image processing system that allows a user to selectively edit corrections carried out automatically by the system. It would furthermore be desirable to have a system that generates a preview image including a low resolution version of the image and metadata representing the corrected area(s) of the image such that the original image does not have to be reanalyzed by the system each time a user switches between viewing the image with corrections applied and not applied.

SUMMARY OF THE INVENTION

The present invention addresses the above need by providing a system allowing selective editing of a displayed digital image that has undergone automatic red eye correction. In a first aspect, a user may selectively edit the image by clicking on or otherwise selecting an area that has been altered via a red eye or other correction system and undo or edit the correction.

In a further aspect, the invention provides a system that generates a preview image file represented by a low resolution corrected image (i.e., a preview image) including a low resolution version of the original image and metadata representing the corrected area(s) of the image. The invention further allows for the correction metadata to be edited, thereby establishing modified correction metadata, wherein a revised version of said low resolution corrected image includes said modified correction metadata As such, the system does not have to reanalyze the original image each time a user switches between viewing and comparing the original digital image, the low resolution corrected image, and the revised version of the low resolution corrected image.

In an optional embodiment, the system may alert the user to the area or areas that have undergone red eye or other automatic correction on the displayed image. For example, the system may provide a visual marker on the digital image indicating to the user where a correction has been made.

In yet a further optional embodiment, the system may include a learning algorithm that updates the system each time an edit is made by the user. The learning algorithm operates to learn the types of regions of interest and automatic corrections carried out thereon by the system that have been subsequently edited by the user. As such, the same or similar regions of interest are ignored or further queried prior to the system carrying out the automatic correction step on subsequently presented digital images. The query may include the step of alerting the user to a "questionable" area of interest and prompt the user to either proceed with the correction or instruct the system to ignore it.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Figure 1:
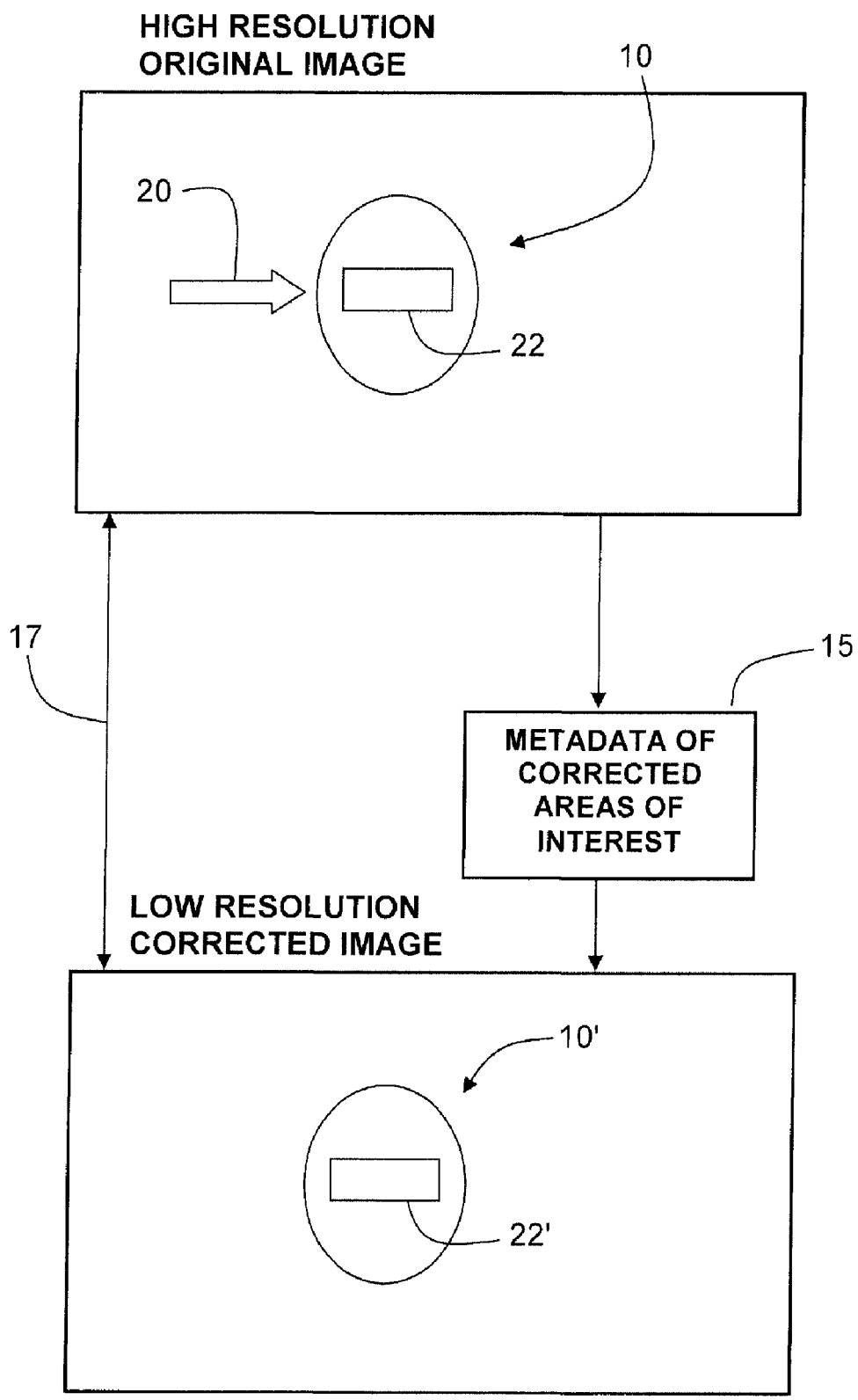
FIG. 1 is a simplified block diagram of a digital frame indicating a region of interest and a corrected area of interest.
Figure 2:
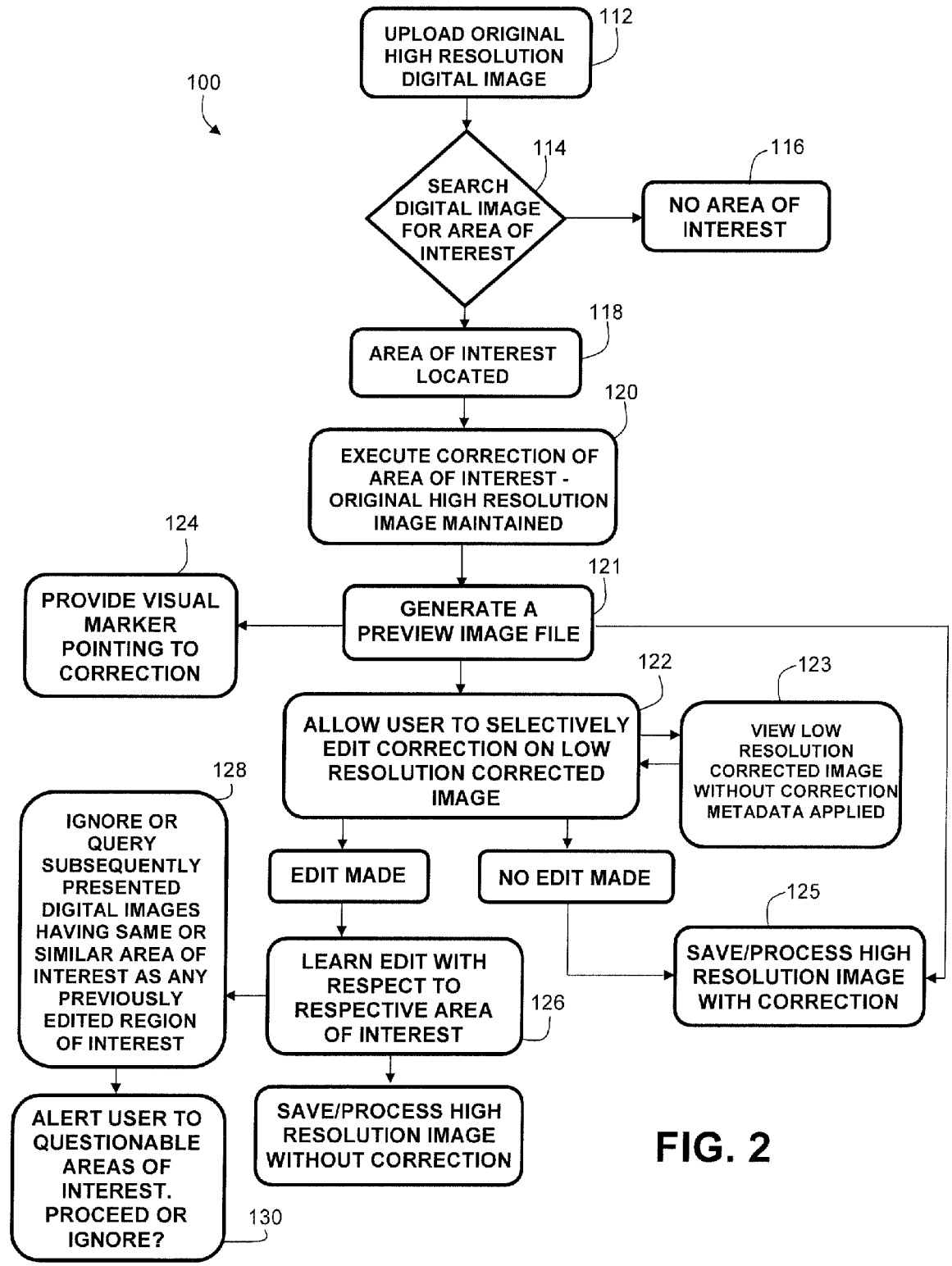
FIG. 2 is a flow diagram showing basic process flow steps in an embodiment of the invention.

Referring to FIGS. 1 and 2, an embodiment of the present invention will now be described with regard to the basic process steps of a digital image processing system indicated generally by the reference numeral 100 in FIG. 2. System 100 may be embodied in a computer-readable medium or program having a set of computer-executable instructions for carrying out or performing the indicated digital image processing. The digital image processing of the present invention may be performed under the control of a user alone, a photofinishing service alone, or through communication and steps performed by both a customer and a photofinisher.

As illustrated in block diagram form in FIG. 2, system 100 allows a customer to upload one or more high resolution digital images to a personal computer or photofinisher as indicated at block 112. The digital images may be uploaded to a photofinisher in any desired manner such as using a wireless transmission directly from a digital camera, a personal computer, scanner, photo kiosk, or the like. In addition, it will be understood and appreciated that the photofinisher computer system may be in a location that is local or remote from the location in which the photo print orders are processed.

With reference to FIGS. 1 and 2, system 100 is configured such that the customer may upload one or more digital images in high resolution format 10 at block 112. System 100 may then search each high resolution digital image 10 for an area of interest at block 114. The area of interest which system 100 looks for may be of any desired type. For example, red-eye elimination software may be used to search for and identify the location of a pair of eyes in the digital image. Therefore, this software may be used in system 100 to search for and identify the location of a pair of eyes in digital image 10 as best seen in FIG. 1.

The area of interest 22 in this embodiment is therefore a pair of eyes. It is understood, however, that the invention is not so limited to an area of interest including only a pair of eyes, but rather is applicable to any desired area of interest that is machine-recognizable using presently known or yet to be developed software. It should also be understood that there may be more than one area of interest within a single digital image. The software may include programming that considers and treats a plurality of areas of interest as a single (large) area of interest. Alternatively, the system may be programmed to rank each area of interest found according to its relative size or density distribution, for example. One possible technique for locating areas of interest in a digital image may be performed by dividing the digital image into a grid and determining the pixel saturation in the various squares of the grid. A weighting is assigned to the squares based on the pixel or luminosity saturation to determine areas of interest. Again, it should be understood that the present invention is applicable to any type and number of areas of interest in a digital image as well as any machine-recognizable method of determining the location of the area or areas of interest.

Referring still to FIG. 2, system 100 completes the search for an area of interest at block 114. If no area of interest was located during the searching step at block 114, system 100 will not execute an auto correction on area of interest instruction since no area of interest has been detected. This is indicated at block 116.

Conversely, with reference to FIGS. 1 and 2, should system 100 locate an area of interest 22 at block 118, system 100 executes an auto correction instruction at block 120 which corrects the area of interest in accordance with the particular programmed instruction (e.g., removing red eye). The original high resolution image 10 is maintained on the system and the corrected areas (i.e., rectangle of pixels encompassing each corrected region from the high resolution image) are saved as metadata as indicated at block 15. Once the correction area(s) have been established, the system generates a preview image file represented in FIG. 1 by a low resolution corrected image (i.e., preview image) including a low resolution version of the image 10' and the correction metadata at block 121. After the preview image file is generated, the user is allowed to selectively edit the correction 22' by removing or keeping the correction at block 122, thereby modifying the correction metadata (i.e., modified correction metadata) to establish a revised version of the low resolution corrected image.

The user may switch between viewing on a display the preview image with the correction metadata applied or not applied, either per correction or with all of the corrections applied, at block 123. This is also indicated by double arrow 17. For example, a user may view or otherwise compare both the low resolution version of the digital image and the low resolution corrected image, which includes the correction metadata. In addition, the present invention also allows a user to view and compare the low resolution corrected image and the revised version of the low resolution corrected image after the correction metadata has been edited or otherwise modified. Moreover, the present invention also may allow a user to view and compare the low resolution version of said digital image and said revised version of said low resolution corrected image.

Since the corrected areas of interest are saved as metadata at block 15 and block 121, the system does not need to reanalyze the original high resolution image as at block 114 each time the user switches between corrected and uncorrected views. This improves the efficiency of the system. If and when the user desires to save and/or process (e.g., print) the high resolution image with corrected regions, the system simply accesses the correction metadata of block 121 and applied the correction metadata to the original high resolution image 10 at block 125. Furthermore, if the correction metadata was edited in view of block 122, the modified correction metadata is applied to the original high resolution image 10 prior to saving and/or processing the digital image.

In an optional embodiment, the system may alert the user to the area or areas that have undergone red eye or other automatic correction on the displayed image. For example, as seen in FIG. 1 and block 124 of FIG. 2, system 100 may provide a visual marker 20 on the area of interest 22 in digital image 10 indicating to the user where a correction has been made.

In yet a further optional embodiment, system 100 may include a learning algorithm or program that updates the system each time an edit is made by the user as indicated at block 126. The learning algorithm or program operates to learn the types of areas of interest and automatic corrections carried out thereon by the system and that have been subsequently edited by the user. As such, the same or similar areas of interest are ignored or further queried prior to the system carrying out the automatic correction step on subsequently presented digital images as indicated at block 128. The query may include the step of alerting the user to a "questionable" area of interest and prompt the user to either proceed with the correction or instruct the system to ignore it as at block 130.

It will be understood and appreciated that the method for digital image processing by a customer and/or a photofinisher described above may be accessible to and executed by system 100 in accordance with pre-programmed algorithms, execution instructions or sequences, computations, software code modules, interface specifications or the like. Further, the method performed by system 100 may be implemented in a computing environment such as a personal computer (PC) or other computing device. Such computer may also include a storage device including volatile and nonvolatile, removable and non-removable media implemented in any method or technology for storing information such as program modules, data structures, computer readable instructions, or other data.

The computer storage media may include, but is not limited to, floppy disks, conventional hard disks, read only memory (ROM), random access memory (RAM), flash memory, electrically erasable programmable read-only memory (EE- PROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by system 100.

System 100 may also include communication media for sending and receiving signals, instructions or other parameters between the customer and the photofinisher. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a direct wired connection, and wireless media such as acoustic, radio frequency, infrared and other wireless media. It will be understood that combinations of any of the above should also be included within the scope of computer readable media.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method of allowing for selective editing of a digital image that has undergone a correction of at least one area of interest, said method comprising:
    a) providing for the identification and correction of said at least one area of interest in said digital image while maintaining said digital image;
    b) providing said correction of said at least one area of interest as correction metadata;
    c) providing a low resolution corrected image using a low resolution version of said digital image and said correction metadata; and
    d) allowing said correction metadata to be edited to establish modified correction metadata, wherein a revised version of said low resolution corrected image includes said modified correction metadata.

2. The method of claim 1 further comprising the step of providing for viewing both said low resolution version of said digital image and said low resolution corrected image.

3. The method of claim 2 wherein said viewing of said low resolution corrected image includes viewing all of said corrected areas of interest.

4. The method of claim 1 further comprising the step of providing for viewing both said low resolution corrected image and said revised version of said low resolution corrected image.

5. The method of claim 1 further comprising the step of providing for viewing both said low resolution version of said digital image and said revised version of said low resolution corrected image.

6. The method of claim 1 further comprising the step of saving or processing said digital image with said modified correction metadata.

7. The method of claim 1 wherein said computer-executable instructions include a learning algorithm.

8. The method of claim 1 further comprising the step of providing an alert directed toward said at least one area of interest that has undergone the correcting step.

9. The method of claim 8 wherein said alerting step includes a visual marker on said digital image.

10. The method of claim 1 wherein said at least one area of interest is an eye.

11. The method of claim 1 wherein said correcting of said at least one area of interest is performed automatically.

12. A computer-readable medium having computer-executable instructions for performing a method for correcting a digital image having at least one area of interest, said method comprising:
    a) identifying and correcting said at least one area of interest in said digital image while maintaining said digital image;
    b) providing said correction of said at least one area of interest as correction metadata;
    c) providing a low resolution corrected image using a low resolution version of said digital image and said correction metadata; and
    d) allowing said correction metadata to be edited to establish modified correction metadata, wherein a revised version of said low resolution corrected image includes said modified correction metadata.

13. The method of claim 12 further comprising the step of providing for viewing both said low resolution version of said digital image and said low resolution corrected image.

14. The method of claim 13 wherein said viewing of said low resolution corrected image includes viewing all of said corrected areas of interest.

15. The method of claim 12 further comprising the step of providing for viewing both said low resolution corrected image and said revised version of said low resolution corrected image.

16. The method of claim 12 further comprising the step of providing for viewing both said low resolution version of said digital image and said revised version of said low resolution corrected image.

17. The method of claim 12 further comprising the step of saving or processing said digital image with said modified correction metadata.

18. The method of claim 12 wherein said computer-executable instructions include a learning algorithm.

19. The method of claim 12 further comprising the step of providing an alert directed toward said at least one area of interest that has undergone the correcting step.

20. The method of claim 19 wherein said alerting step includes a visual marker on said digital image.

21. The method of claim 12 wherein said at least one area of interest is an eye.

22. The method of claim 12 wherein said correcting of said at least one area of interest is performed automatically.

* * * * *